United States Patent
Matsuoka

(10) Patent No.: US 7,370,146 B2
(45) Date of Patent: May 6, 2008

(54) RECORDING/REPRODUCING CONTROL APPARATUS

(75) Inventor: Masayoshi Matsuoka, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 355 days.

(21) Appl. No.: 11/140,954

(22) Filed: Jun. 1, 2005

(65) Prior Publication Data
US 2005/0273558 A1 Dec. 8, 2005

(30) Foreign Application Priority Data
Jun. 2, 2004 (JP) ............................. P2004-164023

(51) Int. Cl.
*G06F 12/00* (2006.01)
*G06F 13/00* (2006.01)
(52) U.S. Cl. ...................... 711/114; 711/100; 711/103; 711/154
(58) Field of Classification Search ................ 711/100, 711/103, 105, 111, 112, 113, 114, 154, 203
See application file for complete search history.

(56) References Cited
U.S. PATENT DOCUMENTS
5,784,528 A * 7/1998 Yamane et al. ............. 386/112
6,549,722 B2 * 4/2003 Okada et al. ................. 386/98
2003/0123855 A1 * 7/2003 Okada et al. ................. 386/98

FOREIGN PATENT DOCUMENTS

| JP | 2001-238169 | 8/2001 |
|---|---|---|
| JP | 2001-318881 | 11/2001 |
| JP | 2002-298501 | 10/2002 |
| JP | 2002-351705 | 12/2002 |
| JP | 2002-359794 | 12/2002 |
| JP | 2003-199012 | 7/2003 |

* cited by examiner

*Primary Examiner*—Tuan V. Thai
(74) *Attorney, Agent, or Firm*—Morgan, Lewis & Bockius LLP

(57) ABSTRACT

A recording/reproducing apparatus 11 has a directory service block 22 that stores management data for enabling search for stream data recorded in a virtual recording space, a controlled block 21 for receiving stream data identification information and a reproducing or recording command, a configuration information block 24 that stores division management data having information specifying storage units, in which divided stream data are respectively stored, and also specifying an order of division, a virtual disc control block 23 for editing the division management data and for requesting of plural slave discs 40 for reproducing or recording of stream data, and a streaming control block for transferring stream data, which is inputted thereto and outputted therefrom, according to a command issued from the disc device control block 26.

6 Claims, 2 Drawing Sheets

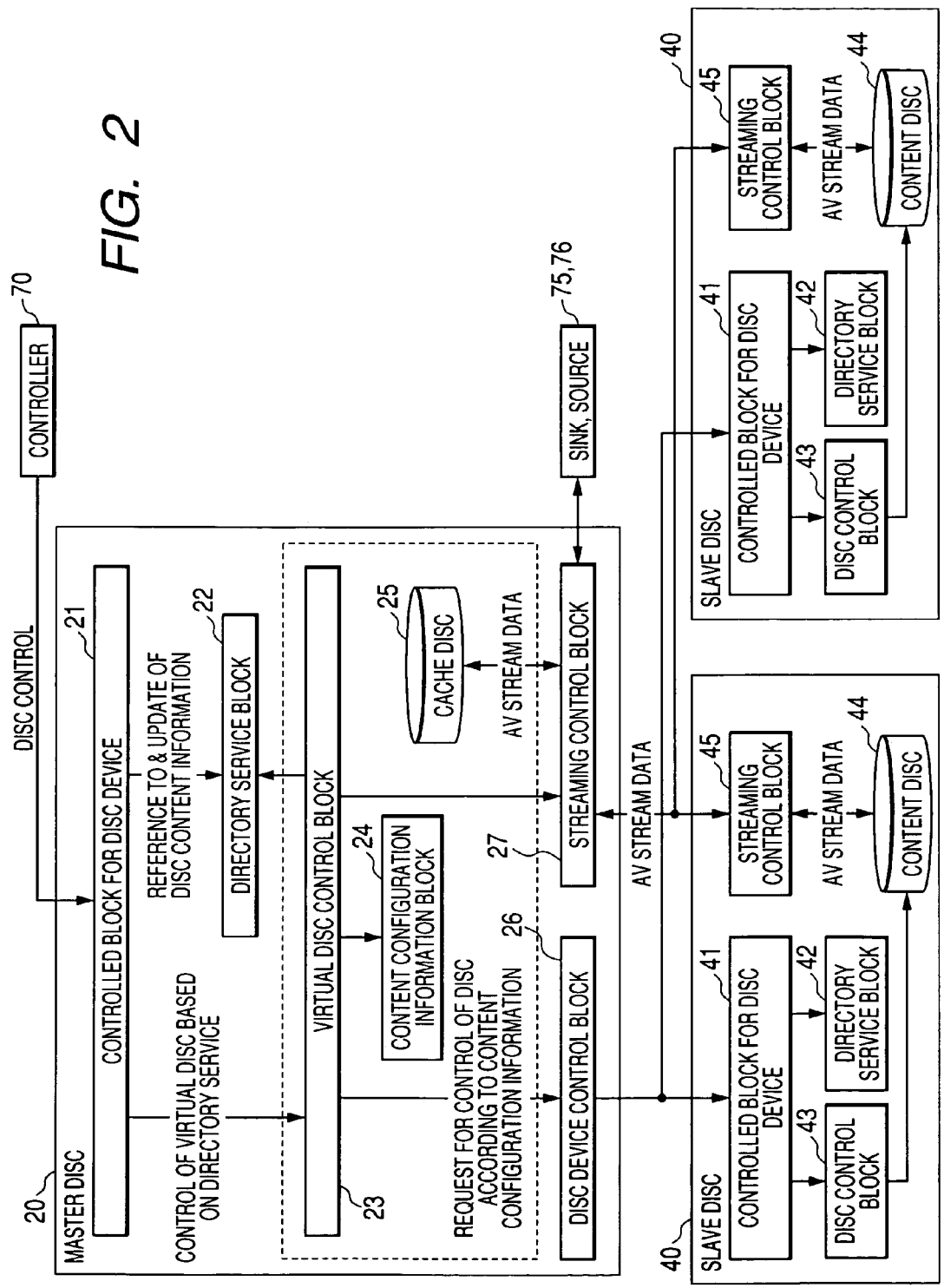

RECORDING/REPRODUCING CONTROL APPARATUS

BACKGROUND OF THE INVENTION

1. Field of the Invention

The present invention relates to a recording/reproducing control apparatus for dividing stream data, for recording divided stream data on plural storage units, and for continuously reproducing the divided data.

2. Description of the Related Art

In the case of recording and reproducing digital broadcasting programs or the like, sometimes, the free space of one storage unit is insufficient therefor. This may cause a demand for storing digital broadcasting programs over plural storage units.

Also, in recent years, many visual devices each having an interface based on IEEE 1394 standards have appeared. For example, digital video recording can be performed among plural devices by connecting devices, which have tuner functions, to device having digital recording functions.

Hitherto, there have been disclosed techniques of storing continuous video data over plural storage units (see JP-A-2002-298501, JP-A-2001-318881, JP-A-2002-359794, and JP-A-2003-199012).

SUMMARY OF THE INVENTION

However, the aforementioned conventional techniques have a problem that when digital recording is performed by causing plural devices to cooperate with one another, each of the plural devices should have a control function for performing recording/reproducing over the plural devices.

Thus, the aforementioned conventional techniques have another problem that, for instance, when such recording/reproducing is performed among plural devices each having an interface based on the IEEE 1394 standard, functions of divisionally recording data and of continuously reproducing the divisionally-recorded data should be added to each of all devices, which issue recording/reproducing commands, and plural devices that record data.

Accordingly, an object of the invention is to provide a recording/reproducing control apparatus enabled to perform divisional recording of stream data and continuous reproducing of the divided stream data simply by causing the devices, which issue recording/reproducing commands, and the plural devices, which record data, to perform operations similar to those thereof in the case of handling a single continuous stream data entity.

According to a first aspect of the invention, there is provided a recording/reproducing control apparatus for recording stream data, which is continuously transferred with time, over a plurality of storage units and for reproducing the stream data from the storage units, the recording/reproducing control apparatus including: a directory service block that stores management data for enabling retrieval of stream data, which is recorded over plural storage units, in a virtual recording space by treating the stream data as being recorded in the virtual recording space; a controlled block that receives identification information of stream data and a recording or reproducing command, and outputs a recording or reproducing command by specifying target stream data in the virtual recording space according to the management data stored in the directory service block; a configuration information block that stores, in a case where a single continuous stream data entity is recorded on plural storage units by being divided, division management data including information indicating storage units that respectively store the divided stream data, and information indicating an order of division; a first control block that receives the command from the controlled block, outputs a request to the directory service block for editing the division management data, and outputs a request to the storage units for recording and reproducing the stream data in accordance with the division management data; a second control block that outputs identification information of stream data and a recording or reproducing command in response to a request from the first control block; and a streaming control block that transfers stream data inputted and outputted according to the command outputted from the second control block while performing timing control, wherein the streaming control block transfers the stream data to the storage units for recording by adding a time stamp to the stream data, the time stamp representing reception timing with which each part of the data is received, wherein the first control block stores a time stamp offset value into the configuration information block, the time stamp offset value representing an amount of deviation that caused in the time stamps of the stream data divided from an original stream data when the original stream data is dividedly recorded in the storage units, wherein the streaming control block that compensates the divided stream data in accordance with the time stamp offset value stored in the configuration information block when reproducing the divided stream data, wherein when the stream data is recorded, the first control block determines whether or not to divide the stream data according to free space of each of the storage units, and wherein the second control block outputs a recording or reproducing command to each of the storage units by using identification information including at least part of information concerning stream data, which is stored in the directory service block.

According to a second aspect of the invention, there is provided a recording/reproducing control apparatus for recording stream data, which is continuously transferred with time, over a plurality of storage units and for reproducing the stream data from the storage units, the recording/reproducing control apparatus including: a directory service block that stores management data for enabling retrieval of stream data, which is recorded over plural storage units, in a virtual recording space by treating the stream data as being recorded in the virtual recording space; a controlled block that receives identification information of stream data and a recording or reproducing command, and outputs a recording or reproducing command by specifying target stream data in the virtual recording space according to the management data stored in the directory service block; a configuration information block that stores, in a case where a single continuous stream data entity is recorded on plural storage units by being divided, division management data including information indicating storage units that respectively store the divided stream data, and information indicating an order of division; a first control block that receives the command from the controlled block, outputs a request to the directory service block for editing the division management data, and outputs a request to the storage units for recording and reproducing the stream data in accordance with the division management data; a second control block that outputs identification information of stream data and a recording or reproducing command in response to a request from the first control block; and a streaming control block that transfers stream data inputted and outputted according to the command outputted from the second control block while performing timing control.

According to a third aspect of the invention, there is provided a recording/reproducing control apparatus for recording stream data, which is continuously transferred with time, over a plurality of storage units and for reproducing the stream data from the storage units, the recording/reproducing control apparatus including: directory service means for storing management data for enabling retrieval of stream data, which is recorded over plural storage units, in a virtual recording space by treating the stream data as being recorded in the virtual recording space; controlled means for receiving identification information of stream data and a recording or reproducing command, and outputting a recording or reproducing command by specifying target stream data in the virtual recording space according to the management data stored in the directory service means; configuration information means for storing, in a case where a single continuous stream data entity is recorded on plural storage units by being divided, division management data including information indicating storage units that respectively store the divided stream data, and information indicating an order of division; first control means for receiving the command from the controlled block, outputting a request to the directory service block for editing the division management data, and outputting a request to the storage units for recording and reproducing the stream data in accordance with the division management data; second control means for outputting identification information of stream data and a recording or reproducing command in response to a request from the first control means; and streaming control means for transferring stream data inputted and outputted according to the command outputted from the second control means while performing timing control.

BRIEF DESCRIPTION OF THE DRAWINGS

The above objects and advantages of the present invention will become more apparent by describing preferred exemplary embodiments thereof in detail with reference to the accompanying drawings, wherein:

FIG. 2 is a functional block diagram illustrating the configuration of each of a master disc, which serves as the recording/reproducing apparatus according to the invention provided in a DVD/HDD recorder shown in FIG. 1, and slave discs each operating a recording unit.

DETAILED DESCRIPTION OF THE PREFERRED EMBODIMENTS

Figure 1:
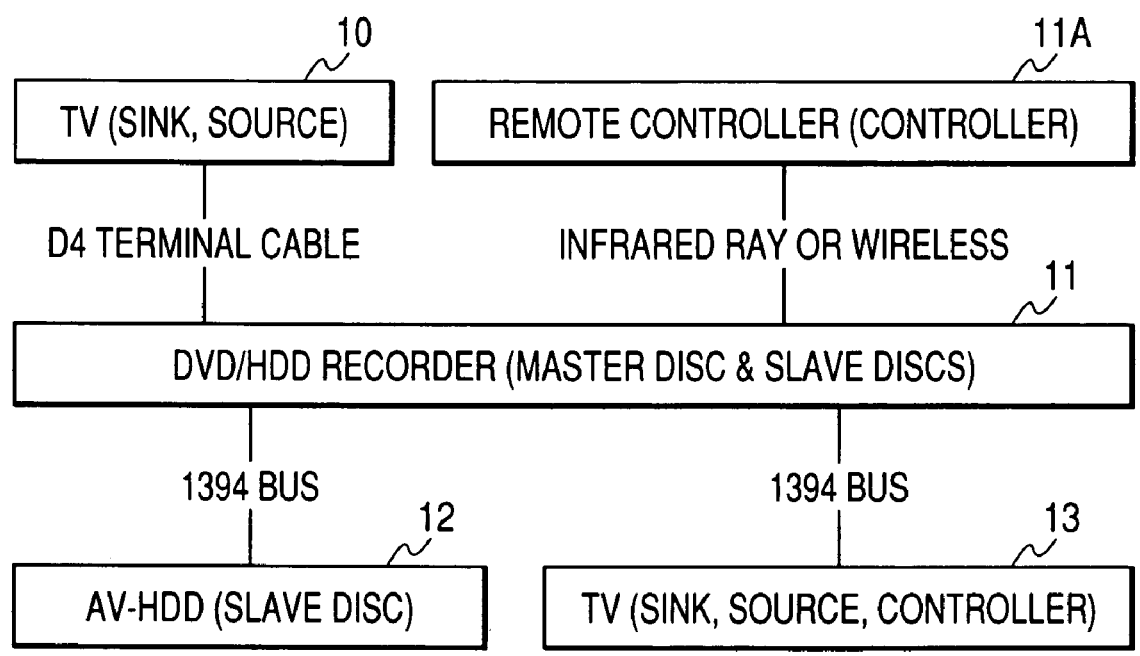
FIG. 1 is a diagram illustrating the configuration of an example of an AV system including a recording/reproducing control apparatus according to an embodiment of the invention.

Hereinafter, an embodiment of the invention is described with reference to the accompanying drawings.

FIG. 1 is a diagram illustrating the configuration of an example of an AV system including a recording/reproducing control apparatus according to the embodiment of the invention.

In FIG. 1, reference numeral 10 designates a television set that incorporates a tuner and that is enabled to receive a television broadcasting signal and to output images thereof and to output video signals representing this video output. Reference numeral 11 denotes a DVD/HDD recorder, which records video data on a DVD (Digital Versatile Disc) and a hard disc. Reference numeral 12 designates an AV-HDD that has a hard disc and that performs only recording/reproducing of video data. Reference numeral 13 denotes a digital television set that incorporates a tuner and that can receive television broadcasting programs and also can output images thereof.

Among these constituents, the recorder 11, the AV-HDD 12, and the digital television set 13 are loaded with an IEEE 1394 interface and are enabled to perform operation control by transferring data thereamong through serial buses to thereby transmit and receive commands thereamong, and are also enabled to transfer video data thereamong.

Further, the recorder 11 and the television set 10 are connected to each other by digital cables through which video/audio signals are transferred. Also, a remote controller 11A, which receives an external manipulation by infrared-rays or by wireless, is attached to the recorder 11.

FIG. 2 is a functional block diagram illustrating the configuration of each of a master disc, which serves as the recording/reproducing apparatus according to the invention, and slave discs each operating as a recording unit.

In FIG. 2, reference numeral 70 designates a controller that issues control commands to perform recording/reproducing of an AV stream (or stream data). Although the controller 70 is not limited to a specific one, the following description is given by assuming that a digital television set 13 has this function. In this case, although not shown, a control command is sent from the controller 70 to a master disc 20 through an IEEE 1394 interface (not shown). A command of a predetermined format, such as a DISC subunit command, which is based on an AV/C protocol for the IEEE 1394 standard, is used as the control command. Alternatively, the apparatus may be adapted so that after a control unit of the recorder 11 once receives this control command based on the IEEE 1394 standard, the control unit converts this command into a control command of a predetermined format and then sends the control command of the predetermined format to the master disc 20.

The aforementioned controller 70 may be constituted by the remote controller 11A of the recorder 11. In this case, an operation signal of the remote controller 11A is once sent to the control unit of the recorder 11. The control unit creates a control command of a predetermined format and sends the created command to the master disc 20.

Further, a source 76 is a supply source for supplying an AV stream to the master disc 20 and is not limited to a specific one. The following description is made by assuming that the digital television set 13 has this function. In this case, the digital television set 13 establishes a logical connection (for example, a point-point connection according to IEC61883 protocol) to the master disc 20 of the recorder 11 through the IEEE 1394 interface. Consequently, the digital television set 13 can continuously supply AV streams.

The television set 10 connected thereto through a digital cable may be applied to the source 76. In this case, the master disc 20 is connected to the television set 10 through a digital compression encoder provided in the recorder 1. Digital video signals sent from the television set 10 are digitally compressed in the recorder. Subsequently, the compressed signals are supplied to the master disc 20. Similarly, a set top box or a VCR (Video Cassette Recorder) may be applied to the source 76. Either a device, which has the IEEE 1394 interface, or that, which does not have the IEEE 1394 interface, can be applied to the source 76 by employing a configuration similar to the aforementioned configurations.

The sink 75 is a device, in which an AV stream is used, and is not limited to a specific one. The following description is made by assuming that the digital television set 13 has this function. In this case, the digital television set 13 establishes a logical connection to the master disc 20 of the recorder 11 through the IEEE 1394 interface. Consequently, an AV stream can continuously be received by the digital television set 11.

The television set 10 connected thereto through a digital cable may be applied to the sink 75. In this case, the master disc 20 is connected to the television set through a decoder provided in the recorder 11. Digitally compressed AV streams are decoded by the decoder into original signals, which are then sent to the television set 10. Additionally, various display devices and VCRs (video cassette recorders) can similarly be applied to the sink 75.

The master disc 20, which is an embodiment of the recording/reproducing control apparatus according to the invention, is mounted in the recorder 11 and transmits AV streams to the sink 75 and the source 76 and receives AV streams therefrom under the control of the controller 70. The master disc 20 has no storage unit for performing recording (except temporary recording) of AV streams. Plural slave discs 40 connected to the master disc 20 actually store AV streams. The master disc 20 controls such plural slave discs 40 so that the slave discs 40 can be handled as a virtual single recording unit.

This master disc 20 includes a controlled block 21 that receives from the controller 70 commands to reproduce and record AV streams, a directory service block 22 for managing a list of names of AV streams recorded in a virtual recording space (hereunder referred to as a virtual disc), a virtual disc control block 23 serving as a first control block for converting a command, which is issued to the virtual disc, into a request to actual storage units, a disc device control block 26 serving as a second control block for issuing the storage units with commands to reproduce and record AV streams, a content configuration information block (corresponding to the configuration information block) 24 for storing, when an AV stream is recorded by being divided, management information concerning the division of the AV stream, a streaming control block 27 for transferring an AV stream while performing timing control, and a cache disc 25 serving as a buffer for the streaming control block 27. Among such constituents, each of the blocks other than the cache disc 25 is implemented as software by a CPU, which is incorporated in the recorder 11, and a program loaded on the memory.

Each of the slave discs 40 has a storage unit (for example, a hard disc, or a DVD (Digital Versatile Disc) for storing AV streams, and performs recording/reproducing of AV streams under the control of the master disc 20 and transmits to the master disc 20 or receives therefrom the AV streams.

Each of the slave discs 40 includes a controlled block 41 for receiving commands to record and reproduce AV streams, a content disc 44, such as a hard disc, a directory service block 42 for managing a list of names of AV streams recorded on the content disc 44, a disc control block 43 for controlling recording of AV streams on and reproducing thereof from the content disc 44, and a streaming control block 27 for transferring an AV stream while performing timing control. Among such constituents, each of the blocks other than the content disc 44 is implemented as software by a CPU, which is incorporated in the recorder 11 or the AV-HDD 12, and a program loaded on the memory.

A system for transmitting a control command from the master disc 20 to the slave disc 40 and a system for performing transmission/reception of AV streams between the master disc 20 and the slave disc 40 are respectively the same as a system for transmitting a control command from the controller 7a to the master disc 20 and a system for performing transmission/reception of AV streams between the master disc 20 and each of the sink 75 and the source 76.

That is, in a case where the slave disc 40 is provided in the recorder 11, the master disc 20 and the slave disc 40 perform transmission and reception of control commands and AV streams directly. However, in a case where the slave disc 40 is provided in the AV-HDD 12 connected to the master disc 20 through the IEEE 1394 serial bus, the transmission and reception of control commands and AV streams are performed therebetween through the IEEE 1394 interface.

Next, an operation of each of the master disc 20 and the slave disc 40 at recording is described hereinbelow.

When an AV stream is recorded, first, a recording command is issued from the controller 70 to the controlled block 21 of the mater disc 20. This recording command includes identification information and content information (concerning a program title, recording date and time, recording capacity, and a video running time).

When receiving the recording command, the controller block 21 records the identification information and the content information of the AV stream on the directory service block 22. Consequently, the identification information and the content information of the AV stream recorded on the virtual disc can be checked by retrieving information in the directory service block 22. Also, the controlled block 21 issues the virtual disc control block 23 a command to cause the virtual disc to store an AV stream in such a way as to correspond to the identification information.

The virtual disc control block 23 reads the content information of the AV stream, which is to be stored, from the directory service block 22. Thus, the virtual disc control block 23 confirms or supposes the data capacity of the AV stream. Then, the virtual disc control block 23 checks free space of the slave disc 40 connected thereto through the disc device control block 26, and retrieves the slave disc 40 whose free space is more than the data amount of the AV stream to be recorded. In a case where such a slave disc is not present, the virtual disc control block 23 retrieves a slave disc 40 having relatively large free space, and determines the retrieved slave disc 40 as a storage unit in which the AV stream is stored. In a case where the slave discs 40 are external devices, such as the AV-HDD 12, the virtual disc control block 23 performs the retrieval in a state in which a logical connection is established between the master disc 20 and the slave disc 40.

Furthermore, the virtual disc control block 23 registers the identification information and major information (concerning the title) included in the content information of the AV stream in the content configuration information block 24 as main keys. Also, the virtual disc control block 23 records information specifying the slave disc 40, on which the AV stream is recorded, and information specifying the AV stream recorded in this slave disc (for instance, information obtained by adding the division No. to the original identification information of the AV stream) therein in such a manner as to correspond to the main keys.

Subsequently, the virtual disc control block 23 makes a request to the disc device control block 26 for recording the AV stream on the detected slave disc 40. The disc device control block 26 issues a recording command to the slave disc 40 according to this request. Identification information stored in the content configuration information block 24 is added to this recording command as identification information of the AV stream.

According to this recording command, the controlled block 41 of the slave disc 40 causes the content disc 44 through the disc control block 43 to perform a recording operation. The AV stream sent from the master disc 20 is recorded on the content disc 44 of this slave disc 40. Also, at that time, the identification information of the AV stream sent together with the recording command is stored in the directory service block 42 of the slave disc 40 so as to manage recording data of the content disc 44. Further, a part of the content information registered in the directory service block 22 of the master disc 20 (that is, information representing the title of a program and the recoding date and time) may be included in the information specifying this AV stream.

AV streams sent to the slave disc 40 are data, which are sent from the source 76 to the master disc 20 and are temporarily stored in the cache disc 25 and sequentially outputted by the streaming control block 27 according to a time stamp thereof. Incidentally, the time stamp is time information added to each of data blocks, into which an AV stream is divided by a short time, and represents the reception timing of each of the data blocks.

During the AV stream is recorded, the virtual disc control block 23 monitors the free space of the slave disc 40 and retrieves another slave disc 40, which has free space, once again when the monitored free space becomes small. Then, the virtual disc control block 23 causes the retrieved slave disc 40, which has free space, to store the rest of the AV stream. The monitoring of the free space can be realized by counting the data amount of an AV stream transmitted to the slave disc 40 and comparing the counted data amount with the preliminarily checked free space of the slave disc 40.

In a case where a disc, on which the AV stream is recorded, is changed to another slave disc, the virtual disc control block 23 registers information, which concerns the division of the AV stream, in the content configuration information block 24, similarly to the aforementioned case. Consequently, in the content configuration information block 24, division management data indicating which of the plural slave discs 40 stores a corresponding one of data obtained by dividing the AV stream is generated.

In a case where a disc, on which the AV stream is recorded, is changed to another slave disc, the continuity of recording the AV stream is interrupted. That is, the time stamp in the AV stream that is divided from the original AV stream is lacked when recording the divided AV stream, and accordingly, a certain amount of deviation of the time stamp occurs between each of the AV streams divided and recorded onto each of the slave discs. The virtual disc control block 23 counts a value of the amount of deviation in time stamp, at that time, and causes the content configuration information block 24 to store the counted value as a time stamp offset value.

A single continuous AV stream can be stored in one or more of the content discs 44 of the slave discs 40 by repeating the process described above.

Next, an operation at reproduction of an AV stream is described hereinbelow.

At reproducing, first, information from the directory service block 22 is read according to the control command sent from the controller 70. For example, this information is display-outputted by the controller 70. Then, a user specifies an optional content according to this information and causes the system to reproduce this content. Thus, a reproducing command is transmitted form the controller 70 to the controlled block 21 of the master disc 20. The identification information of the AV stream to be reproduced is added to this control command.

According to this reproducing control command, the controlled block 21 issues the virtual disc control block 23 a command to reproduce an AV stream corresponding to the identification information. Then, the controller block 21 reads information, which concerns the division of this AV stream, from the content configuration information block 24. According to this information, the controlled block 21 retrieves the slave disc 40 in which leading-data of the AV stream is stored. Subsequently, the controlled block 21 causes the disc device control block 26 to send a reproducing command to this slave disc 40.

The slave disc 40 reads the AV stream from the content disc 44 according to this reproducing command and sends the read AV stream to streaming control block 27 of the master disc 20. The streaming control block 27 of the master disc 20 causes the cache disc 25 to pool this AV stream once, and thereafter transmits the stored AV stream to the sink 75 according to the time stamp.

In a case where an AV stream is recorded over the plural slave discs 40 by being divided, the virtual disc control block 23 monitors an amount of the remaining AV stream, which is to be reproduced, during reproduction of the AV stream. When this amount of the remaining AV stream to be reproduced becomes equal to or less than a predetermined amount, the virtual disc control block 23 retrieves the slave disc 40 on which the remaining AV stream is recorded according to the information stored in the content configuration information block 24. Subsequently, before the AV stream to currently be reproduced reaches a dividing point, the virtual disc control block 23 causes the next slave disc 40 to transmit this AV stream, and also causes the cache disc 25 of the streaming control block 27 to pool the transmitted AV stream.

Then, the virtual disc control block 23 reads the stored time stamp offset value from the content configuration information block 24 and adds a time stamp, which cancels out (compensate) the amount of deviation in time stamp which is lacked when dividing the original AV stream, to the divided AV stream transmitted from the slave disc 40. Subsequently, the virtual disc control block 23 causes the cache disc 25 to pool this AV stream.

The streaming control block 27 transfers the AV stream to the sink 75 according to this time stamp. Thus, the streaming control block 27 can continuously transmit the AV stream, which is recorded over the plural slave discs 40, 40 to the sink 75.

Then, such a process is repeated, so that the single AV stream is continuously transmitted to the sink 75.

As described above, according to the master disc 20 of this embodiment, even in a case where an AV stream is recorded over plural slave discs 40 by being divided, and where the divided AV stream is reproduced, the controller 70, the sink 75 and the source 76 can perform the divisional recording of an AV stream on one recording unit and the continuous reproducing of the divided AV stream by performing operations similar to those thereof in the case of recording a single continuous AV stream on one recording unit and of reproducing the signal continuous AV stream therefrom.

Further, the slave disc 40 can record and reproduce divided AV streams by performing operations similar to those of receiving recording and reproducing control commands directly from the controller 70, of recording and reproducing a single continuous AV stream and of transmitting to the sink 75 and receiving from the source 76 an AV stream.

Therefore, the invention obtains an advantage that the divisional recording and the continuous reproducing of a single continuous AV stream can be achieved only by interposing the master disc 20 among the controller 70, the sink 75, the source 76 and the slave discs 40, 40, without adding special functions to the controller 70, the sink 75, the source 76 and the slave discs 40, 40.

Incidentally, the invention is not limited to the aforementioned embodiment. Various modifications can be made. For example, although it has been described that each of the blocks constituting the master disc 20, and the slave disc 40 is implemented as software by using the CPU, devices having functions similar to those of the blocks can be constituted by hardware.

Further, although the configuration, in which the master disc 20 serving as the recording/reproducing control apparatus is incorporated into the recorder 11, has been described, the recording/reproducing control apparatus may be provided as an independent apparatus and also may be connected to plural audio/visual devices through, for example, the IEEE 1394 interface.

Additionally, various recording media, for instance, a semiconductor storage device may be used as the cache disc functioning as a buffer of the streaming control block.

As described with reference to the embodiment, there is provided a recording/reproducing control apparatus for recording stream data, which is continuously transferred with time, over a plurality of storage units and for reproducing the stream data from the storage units, the recording/reproducing control apparatus including: a directory service block that stores management data for enabling retrieval of stream data, which is recorded over plural storage units, in a virtual recording space by treating the stream data as being recorded in the virtual recording space; a controlled block that receives identification information of stream data and a recording or reproducing command, and outputs a recording or reproducing command by specifying target stream data in the virtual recording space according to the management data stored in the directory service block; a configuration information block that stores, in a case where a single continuous stream data entity is recorded on plural storage units by being divided, division management data including information indicating storage units that respectively store the divided stream data, and information indicating an order of division; a first control block that receives the command from the controlled block, outputs a request to the directory service block for editing the division management data, and outputs a request to the storage units for recording and reproducing the stream data in accordance with the division management data; a second control block that outputs identification information of stream data and a recording or reproducing command in response to a request from the first control block; and a streaming control block that transfers stream data inputted and outputted according to the command outputted from the second control block while performing timing control.

According to such configuration, even in cases where the stream data is recorded by being divided into plural parts, or where the stream data divided into plural parts is continuously reproduced, a device for issuing recording and reproducing commands is caused to issue commands similar to those issued when a single stream data entity is recorded in a virtual recording space and when the single stream data entity recorded in the virtual recording space is reproduced. Thus, the apparatus can deal with such cases. Also, a device for performing recording/reproducing of data can deal with divisional recording or divisional reproduction of the data only by treating the divided stream data as ordinary single stream data entity.

Also, according to an embodiment of this apparatus, it is preferable to configure: that the streaming control block transfers the stream data to the storage units for recording by adding a time stamp to the stream data, the time stamp representing reception timing with which each part of the data is received; that the first control block stores a time stamp offset value into the configuration information block, the time stamp offset value representing an amount of deviation that caused in the time stamps of the stream data divided from an original stream data when the original stream data is dividedly recorded in the storage units; and that the streaming control block that compensates the divided stream data in accordance with the time stamp offset value stored in the configuration information block when reproducing the divided stream data.

With such a configuration, the apparatus can perform continuous recording and reproduction of the stream data recorded by adding the time stamp thereto.

When the stream data is recorded, the first control block is preferable to determine whether or not to divide the stream data according to free space of each of the storage units.

Accordingly, the stream data can be recorded by using the storage area of each of the storage units without waste. Also, the division of the stream data can be performed only when needed.

It is preferable to configure the second control block to output a recording or reproducing command to each of the storage units by using identification information including at least part of information concerning stream data, which is stored in the directory service block.

Accordingly, when a device (for example, a digital television set) for issuing a reproducing command operates directly the storage units through no recording/reproducing control apparatus, the stream data recorded over the storage units by being divided can be retrieved according to identification information (for instance, information concerning the title of a program or concerning the recording date and time) of original stream data. Thus, only the divided data can be reproduced.

As described above, the embodiment has advantages that continuous stream data can be divided and recorded over plural storage units and the divided stream data can continuously be reproduced by causing devices (for example, a digital TV set and a tuner), which issue recording/reproducing commands, and plural storage units (for instance, two hard disc recorders or external two hard disc drives referred to as AV-HDDs), which record stream data, to cooperate with one another.

Also, the embodiment has advantages that the devices, which issue recording/reproducing commands, and the storage units, which record data, can perform divisional recording of stream data and continuous reproducing of the divided stream data through the recording/reproducing apparatus according to the invention simply by performing operations similar to those thereof in the case of handling a single continuous stream data entity, and that there is no necessity for adding special functions to the devices, which issue recording/reproducing commands, and the storage units, which record data.

Although the present invention has been shown and described with reference to the embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A recording and reproducing control apparatus for recording stream data, which is continuously transferred with time, over a plurality of storage units and for reproducing a stream data from the storage units, the recording and reproducing control apparatus comprising:
   a directory service block that stores management data for enabling retrieval of stream data, which is recorded over plural storage units, in a virtual recording space by treating the stream data as being recorded in the virtual recording space;
   a controlled block that receives identification information of stream data and a recording or reproducing command, and outputs a recording or reproducing command by specifying target stream data in the virtual recording space according to the management data stored in the directory service block;
   a configuration information block that stores, in a case where a single continuous stream data entity is recorded on plural storage units by being divided, division management data including information indicating storage units that respectively store the divided stream data, and information indicating an order of division;
   a first control block that receives the command from the controlled block, outputs a request to the directory service block for editing the division management data, and outputs a request to the storage units for recording and reproducing the stream data in accordance with the division management data;
   a second control block that outputs identification information of stream data and a recording or reproducing command in response to a request from the first control block; and
   a streaming control block that transfers stream data inputted and outputted according to the command outputted from the second control block while performing timing control,
   wherein the streaming control block transfers the stream data to the storage units for recording by adding a time stamp to the stream data, the time stamp representing reception timing with which each part of the data is received,
   wherein the first control block stores a time stamp offset value into the configuration information block, the time stamp offset value representing an amount of deviation that caused in the time stamps of the stream data divided from an original stream data when the original stream data is dividedly recorded in the storage units,
   wherein the streaming control block that compensates the divided stream data in accordance with the time stamp offset value stored in the configuration information block when reproducing the divided stream data,
   wherein when the stream data is recorded, the first control block determines whether or not to divide the stream data according to free space of each of the storage units, and
   wherein the second control block outputs a recording or reproducing command to each of the storage units by using identification information including at least part of information concerning stream data, which is stored in the directory service block.

2. A recording and reproducing control apparatus for recording stream data, which is continuously transferred with time, over a plurality of storage units and for reproducing a stream data from the storage units, the recording and reproducing control apparatus comprising:
   a directory service block that stores management data for enabling retrieval of stream data, which is recorded over plural storage units, in a virtual recording space by treating the stream data as being recorded in the virtual recording space;
   a controlled block that receives identification information of stream data and a recording or reproducing command, and outputs a recording or reproducing command by specifying target stream data in the virtual recording space according to the management data stored in the directory service block;
   a configuration information block that stores, in a case where a single continuous stream data entity is recorded on plural storage units by being divided, division management data including information indicating storage units that respectively store the divided stream data, and information indicating an order of division;
   a first control block that receives the command from the controlled block, outputs a request to the directory service block for editing the division management data, and outputs a request to the storage units for recording and reproducing the stream data in accordance with the division management data;
   a second control block that outputs identification information of stream data and a recording or reproducing command in response to a request from the first control block; and
   a streaming control block that transfers stream data inputted and outputted according to the command outputted from the second control block while performing timing control.

3. The recording and reproducing control apparatus according to claim 2, wherein the streaming control block transfers the stream data to the storage units for recording by adding a time stamp to the stream data, the time stamp representing reception timing with which each part of the data is received,
   wherein the first control block stores a time stamp offset value into the configuration information block, the time stamp offset value representing an amount of deviation that caused in the time stamps of the stream data divided from an original stream data when the original stream data is dividedly recorded in the storage units, and
   wherein the streaming control block that compensates the divided stream data in accordance with the time stamp offset value stored in the configuration information block when reproducing the divided stream data.

4. The recording and reproducing control apparatus according to claim 2, wherein when the stream data is recorded, the first control block determines whether or not to divide the stream data according to free space of each of the storage units.

5. The recording and reproducing control apparatus according to claim 2, wherein the second control block outputs a recording or reproducing command to each of the storage units by using identification information including at least part of information concerning stream data, which is stored in the directory service block.

6. A recording and reproducing control apparatus for recording stream data, which is continuously transferred with time, over a plurality of storage units and for reproducing a stream data from the storage units, the recording and reproducing control apparatus comprising:

directory service means for storing management data for enabling retrieval of stream data, which is recorded over plural storage units, in a virtual recording space by treating the stream data as being recorded in the virtual recording space;

controlled means for receiving identification information of stream data and a recording or reproducing command, and outputting a recording or reproducing command by specifying target stream data in the virtual recording space according to the management data stored in the directory service means;

configuration information means for storing, in a case where a single continuous stream data entity is recorded on plural storage units by being divided, division management data including information indicating storage units that respectively store the divided stream data, and information indicating an order of division;

first control means for receiving the command from the controlled block, outputting a request to the directory service block for editing the division management data, and outputting a request to the storage units for recording and reproducing the stream data in accordance with the division management data;

second control means for outputting identification information of stream data and a recording or reproducing command in response to a request from the first control means; and streaming control means for transferring stream data inputted and outputted according to the command outputted from the second control means while performing timing control.

* * * * *